United States Patent [19]
Lacroix

[11] 3,789,236
[45] Jan. 29, 1974

[54] DEVICE FOR MONITORING THE ELECTRICAL ENERGY DELIVERED BY AN ENERGY SOURCE

[75] Inventor: Pierre Lacroix, Mazeres-sur-Salat, France

[73] Assignee: Societe de Travaux d'Electricite et d'Electronique du Languedoc

[22] Filed: Aug. 9, 1972

[21] Appl. No.: 279,235

[30] Foreign Application Priority Data
Aug. 9, 1971    France.................71.29300

[52] U.S. Cl.................. 307/96, 307/126
[51] Int. Cl............................. H02j 7/22
[58] Field of Search............... 307/92, 96, 126

[56] References Cited
UNITED STATES PATENTS

| R17,851 | 10/1930 | Moore | 307/126 |
|---|---|---|---|
| 3,296,452 | 1/1967 | Williams | 307/126 |
| 3,300,648 | 1/1967 | Rockefeller, Jr. et al. | 307/126 |
| 3,566,143 | 2/1971 | Paine | 307/126 |
| 3,540,030 | 11/1970 | Hartz | 307/96 |

*Primary Examiner*—L. T. Hix
*Attorney, Agent, or Firm*—William R. Sherman et al.

[57] ABSTRACT

An apparatus for monitoring the energy supplied by a source to a load system including sensors which provide signals proportional to current and voltage to a multiplier which produces a signal proportional to instantaneous power. The power signal is compared with a reference and the difference is integrated over a preselected interval of time at the end of which the integrator is reset. The integrated signal is compared with a second reference and the difference is applied to a comparator. If the resulting signal exceeds a set limit an alarm is actuated or selected portions of the load are disconnected from the source. A delay circuit prevents actuation at the beginning of the integration.

6 Claims, 1 Drawing Figure

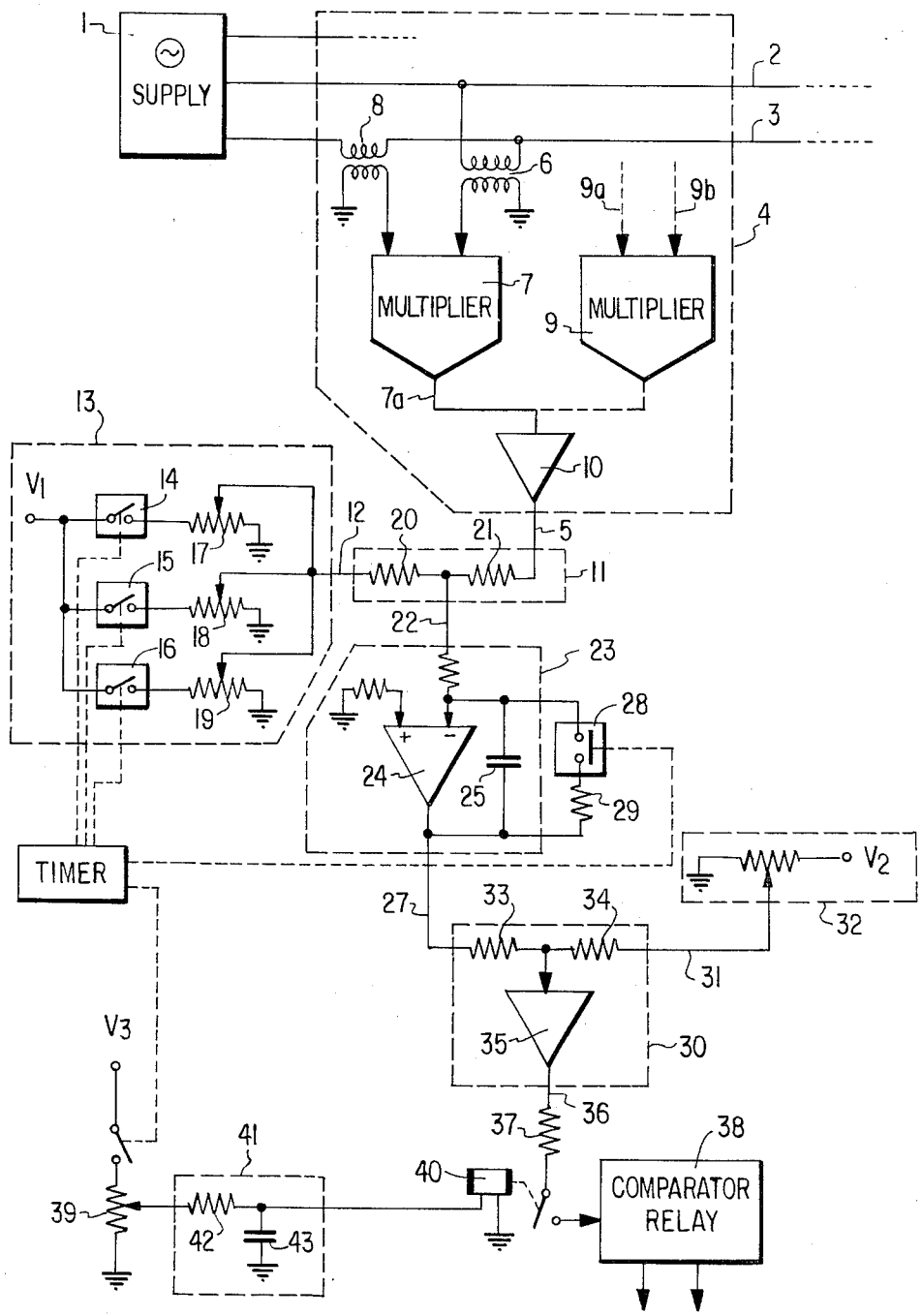

DEVICE FOR MONITORING THE ELECTRICAL ENERGY DELIVERED BY AN ENERGY SOURCE

This invention relates to an apparatus for monitoring the electrical energy delivered by a source of energy to one or more electrical loads, and, more specifically, monitoring means for automatic disconnecting selected loads or indicating the appropriateness of disconnection thereof.

It has become customary in certain areas for users of electrical energy to undertake to consume not more than predetermined quantities of electrical energy per unit time, and, by such undertaking, the users similarly undertake to disconnect portions of their installation when such consumption begins to exceed the preselected limits.

In such an installation, it is clearly necessary for the user to know what his consumption of electricity is at clearly defined points in time so as to respond appropriately to overloads. If the consumption of electricity increases above a limit, certain devices in the installation can be disconnected from the source of energy. It will be recognized that in an industrial plant certain devices can be disconnected or deenergized without difficulty while others, more essential to continued operation of the plant, must continue to receive electrical energy.

There are in the prior art certain devices permitting the continuing monitoring of electrical energy delivered by the source, but such devices generally consist at least in part of mechanical structures which have significant disadvantages.

A primary object of the present invention is to provide a device for monitoring the electrical energy delivered by an energy source.

It is also an object of the present invention to provide a device for monitoring the power delivered by a source of electrical energy, which device is simple in design and is reliable.

Yet another object is to provide a device for monitoring power delivered by a source of energy and for disconnecting and/or reconnecting selected devices in response to the level of energy provided.

Briefly described, the invention includes means connected to the source of energy for providing an electrical signal having an amplitude representative of the instantaneous power delivered by the energy source, an adder for receiving that electrical signal and a reference signal and providing a further signal which represents the difference between the two, the reference signal being proportional to a preselected power level, an integrator for integrating the resulting signal with respect to time, means for resetting the integrator at selected intervals, and means for determining the value of the result of the integration and for controlling energization of selected equipment in response to that value.

In order that the manner in which the foregoing and other objects are attained in accordance with the invention can be understood in detail, a particularly advantageous embodiment thereof will be described with reference to the accompanying drawings, which form a part of this specification, and wherein the FIGURE constitutes a schematic diagram, partly in block form, of an electrical apparatus in accordance with the invention.

In the FIGURE, a source of energy 1 provides electrical energy on conductors 2 and 3 to various pieces of equipment in, for example, an industrial plant and it is the power being delivered to the total of these various pieces of equipment that is to be monitored. Coupled to conductors 2 and 3 is a means 4 for monitoring this power including a voltage transformer indicated generally at 6 having its primary winding connected across conductors 2 and 3 and having its secondary winding connected to one input terminal of a multiplier circuit 7. A current transformer indicated generally at 8 similarly has its primary winding connected in series circuit relationship with one of the conductors and its secondary winding connected to the other input of multiplier circuit 7. The multiplier circuit therefore receives signals proportional to the instantaneous values of voltage and current on the lines and multiplies these to provide an output signal on conductor 7a representative of the instantaneous power being provided on conductors 2 and 3. This signal is provided to an amplifier 10, the output of which constitutes the output of the sensing means 4 and appears on conductor 5.

It will be recognized that the example thus far described constitutes a system wherein the energy source is a single phase source. In the event of a three phase system a second multiplier circuit 9 having inputs 9a and 9b can be suitably connected to receive voltage and current input signals, in a well-known manner, the output of multiplier 9 being also connected to amplifier 10 to contribute to the output signal. In any event, the signal appearing on conductor 5 will be representative of the instantaneous total power being provided by source 1 to the various loads being monitored.

The output signal on conductor 5 is connected to one input of an adder circuit 11, a second input terminal of which is connected to the output of a first reference signal source 13. Source 13 can include a terminal connected to a substantially constant source of voltage $V_1$ which is connected to supply three circuits in parallel circuit relationship with each other, each including a switch and an ad ustable resistor. A switch 14 is connected in series circuit relationship with a potentiometer 17 between the source and ground, and switches 15 and 16 are connected in series circuit relationship with potentiometers 18 and 19, respectively, also in parallel circuit relationship. The movable contacts of these potentiometers are connected to a common point which is electrically the same as conductor 12 constituting the output of source 13.

The operation of switches 14, 15 and 16 is controlled by a timer 50, to be described in greater detail hereinafter, in a manner which permits any one of the switches to be closed during a given interval of time. Thus, potentiometers 17, 18 and 19 can be set to select three preselected voltages, any one of which is then coupled to output conductor 12 by the closure of one of the switches.

Adder 11 constitutes a resistive summing circuit having fixed resistors 20 and 21 connected in series circuit relationship between conductors 5 and 12, the output of the summing circuit being taken at conductor 22 from the junction of these two resistors. This output is connected to the input of an integrating circuit 23, which circuit includes a differential amplifier 24 having its non-inverting terminal connected through a fixed resistor to ground and having a capacitor 25 connected between the output terminal and the inverting input terminal. The output of adder 11 is connected through a fixed input resistor to the inverting input terminal in conventional manner.

The integrator is provided with a resetting circuit including a small current limiting resistor 29 in series circuit relationship with a normally open switch 28, switch 28 being controlled by timer 50. When closed, the reset circuit rapidly discharges capacitor 25 and returns the integrator to a zero output state.

The output of integrator 23 is taken on conductor 27 to one input of another adder circuit 30, the other input of which appears on conductor 31 and arrives from a reference voltage source 32. Adder circuit 30 includes fixed resistors 33 and 34 connected in series circuit relationship between conductors 27 and 31, the junction of the two fixed resistors being connected to the input of an operational amplifier 35. The output of adder circuit 30 appears on conductor 36 and is connected through a fixed resistor 37 and the normally open contact set of a delayed operation relay indicated generally at 40 to a comparator relay 38 which, upon the existence of predetermined relative magnitude conditions, disconnects certain electrical loads from conductors 2 and 3.

Relay 40 is energized from a delay circuit 41 which includes a series resistor 42 and a shunt capacitor 43 connected between relay 40 and a potentiometer 39. A switch indicated generally at 44 is operated by timer 50 to connect one end of the resistance element of potentiometer 39 to a source of voltage $V_3$, the other end of potentiometer 39 being connected to ground. Upon closure of switch 44, capacitor 43 begins to charge to the voltage appearing at the movable contact of potentiometer 39. Upon arrival at the pull-in level of relay 40, the contact set thereof is closed, connecting the output of adder 30 to relay 38. If the voltage at fixed resistor 37 is sufficiently great, relay 38 disconnects the preselected loads from the energy source.

As previously described, certain consumers of electrical energy can agree not to exceed certain levels of consumption of energy. The measurement of consumption on which this agreement is based is in terms of power per unit time and is measured in predetermined intervals of, for example, ten minutes. Thus, it is desirable for the apparatus to determine the total energy consumed within each ten minute interval of time and to compare that consumption level with a preselected threshold, regardless of the distribution of the energy consumption within the ten minute interval. In actuality, electrical signals representative of the energy consumption and the thresholds are compared.

The operation of the circuit, with a single phase supply, can be considered by beginning with voltage and current signals provided to multiplier 7 by transformers 6 and 8, resulting in a power representative signal at conductor 5. The signal at that point is compared in adder 11 with a signal provided by source 13. As previously described, source 13 can provide any one of a plurality of signals for comparison. It will be recognized that the authorized consumable power may be different during one portion of a day, and that the consumable power during a winter day is different from the permissible consumable power during a summer day. Thus, provision is made for the reference source to be able to supply adjustable signals depending upon the interval of time involved. Thus, timer 50 is set to close one switch during a portion of a day, another switch during a different portion, etc. Generally, the output signal from each source represents the maximum power consumable so that the difference signal on conductor 22 is inversely proportional to the power consumed until that threshold is reached. In other words, as the power consumption increases toward the threshold value the signal on conductor 22 decreases.

The signal at the output of adder 11 is then provided to integrator 23. Switch 28 which resets integrator 23 is controlled to close and open at the beginning of each interval over which the power is to be measured which, in the previously suggested example, is 10 minutes. Thus, the integrator begins from zero at the initiation of the ten minute interval and integrates the difference between a signal representative of consumed power and a signal representative of a threshold level selected for the specific interval of time.

The output of the integrator at conductor 27 is then compared with another reference in adder circuit 30, the second reference being a voltage which can be referred to as an alarm voltage obtained from source 32. Source 32 is also selected to be greater than the usual anticipated voltage from the output of the integrator so that a subtraction is accomplished, the result thereof being buffered by amplifier 35 and provided to relay 38 through resistor 37. Relay 38 is a conventional comparator relay circuit which is selected to given an alarm or to interrupt delivery of power to the load whenever a voltage supplied thereto exceeds a preselected threshold.

It will be seen that the voltage delivered by source 13 represents the instantaneous value, distributed in time, of the maximum consumable power so that the voltage obtained at conductor 11 is subtracted from that delivered by circuit 4. The integration of this signal is then compared with a second source and the subtraction of those two voltages appears at the output of adder 30. Thus, the higher the consumption of electricity, the greater the signal at the output of circuit 4 and the smaller the signal at the output of adder 11. The signal obtained at the output of the integrator will also therefore be small, i.e., the greater the consumption of energy the smaller the integrator output. The alarm voltage represents, for example, a mean value of power lower than that which is the limit of permitted consumption. Thus, the comparison between the integrator output and the signal at source 32, which is a subtraction, provides an output which will operate relay 38 only if a significant negative voltage is coupled through relay 40. This is true because it is necessary that the output of the integrator be much smaller than the signal delivered by source 32 for an alarm condition to exist.

It will be recognized that the output of the integrator will always be significantly smaller than source 32 at the beginning of each interval of integration, and this fact is the reason for the existence of the delay circuit and relay 40. In order to avoid a false alarm occurring at the beginning of each integration interval, the delay circuit disconnects the output of adder circuit 30 from relay 38 until the integrator has had an opportunity to build to an adequate value, i.e., greater than that of the signal supplied by source 32. Switch 44 is operated concurrently with, but in the reverse direction from, switch 28 so that when switch 28 is opened switch 44 is closed and the delay interval is commenced. When the voltage at capacitor 43 is large enough relay 40 is energized and the output of adder 30 is connected to circuit 38, the adjustment of potentiometer 39 being established depending upon the integration interval selected. In an integration interval of approximately ten minutes, the delay would be established to remain open for approximately 3-4 minutes.

While only one relay is illustrated in the FIGURE, it will be apparent that the apparatus can include a program matrix, the inputs of which are connected to the outputs of the relay 38 and the programmable outputs of which can control various switches of various installations. Thus, it would be possible to select those installations which could be deenergized without causing any difficulty, to continue to feed the other installations for which operation is essential, and to change the permutation of these various installations from day to day or week to week.

While one advantageous embodiment has been chosen to illustrate the invention it will be understood by those skilled in the art that various changes and modifications can be made therein without departing from the scope of the invention as defined in the appended claims.

What is claimed is:

1. An apparatus for monitoring the electrical energy delivered by a source comprising the combination of
    means connected to the output of the source for producing a first electrical signal proportional to the instantaneous value of the power being delivered by the source;
    means for providing a first reference signal;
    means for algebraically subtracting said first electrical signal and said first reference signal to produce a difference signal;
    means for integrating said difference signal for a predetermined interval of time; and
    means for resetting said means for integrating after the end of said interval.

2. An apparatus according to claim 1 and further comprising
    means responsive to the output of said means for integrating for disconnecting an electrical load from said source when said output meets a predetermined magnitude criterion.

3. An apparatus according to claim 1 and further comprising
    an alarm; and
    means responsive to the output of said means for integrating for activating said alarm when said output meets a predetermined magnitude criterion.

4. An apparatus according to claim 1 wherein said means connected to the output of the source comprises
    first means for generating a signal proportional to the instantaneous value of current delivered by said source;
    second means for generating a signal proportional to the instantaneous value of source output voltage; and
    multiplier circuit means for accepting said first and second signals and producing said signal proportional to the instantaneous value of current.

5. An apparatus according to claim 1 wherein
    said means for integrating includes an operational amplifier and a capacitor connected between the output and input terminals thereof; and timing means for selectively rendering said path conductive to discharge said capacitor.

6. An apparatus according to claim 1 and further comprising
    means for determining the value of said integration signal in relation to a given value, before the resetting of said integrator, comprising means for providing a second electrical reference signal;
    an adder for combining said second reference signal and the output of said means for integrating;
    and an adjustable delay switch connected to the output of said adder to disconnect the output of said adder after each resetting of said means for integrating for a time shorter than the time elapsed between each resetting of said integrator.

* * * * *